United States Patent [19]

Ota et al.

[11] 4,375,442

[45] Mar. 1, 1983

[54] METHOD FOR PRODUCING POLYESTER CONTAINER

[75] Inventors: Akiho Ota, Funabashi; Fumio Negishi, Tokyo, both of Japan

[73] Assignee: Yoshino Kogyosho Co., Ltd., Tokyo, Japan

[21] Appl. No.: 229,877

[22] Filed: Jan. 30, 1981

Related U.S. Application Data

[63] Continuation of Ser. No. 19,913, Mar. 12, 1979, abandoned.

[30] Foreign Application Priority Data

Jun. 29, 1978 [JP] Japan ................................. 53-89840
Jul. 4, 1978 [JP] Japan ................................. 53-81340
Oct. 9, 1978 [JP] Japan ................................. 53-124303

[51] Int. Cl.³ ............................................. B29C 17/07
[52] U.S. Cl. ................................. 264/25; 264/520; 264/521; 264/532; 264/535; 264/235; 264/346
[58] Field of Search ................. 264/25, 519, 520, 521, 264/235, 346, 535, 532, 523, 530; 428/35, 910; 215/1 C

[56] References Cited

U.S. PATENT DOCUMENTS

| | | | |
|---|---|---|---|
| 3,544,673 | 12/1970 | Inskeep et al. ...................... | 264/235 |
| 3,555,135 | 1/1971 | Paul ................................. | 264/235 X |
| 3,562,372 | 2/1971 | Schjeldahl et al. ............. | 264/237 X |
| 3,733,309 | 5/1973 | Wyeth et al. ................ | 264/DIG. 33 |
| 4,025,594 | 5/1977 | Agrawal .......................... | 264/235 X |
| 4,039,641 | 8/1977 | Collins ............................. | 264/524 X |
| 4,179,488 | 12/1979 | Nishikawa et al. ................. | 264/521 |

FOREIGN PATENT DOCUMENTS 2540930 4/1976 Fed. Rep. of Germany ...... 264/538

*Primary Examiner*—Jan H. Silbaugh
*Attorney, Agent, or Firm*—Stevens, Davis, Miller & Mosher

[57] ABSTRACT

Spherulites are grown in such sections as neck, neck end, and bottom center or bottom periphery of a hollow bottle-shaped container of biaxially oriented-blow molded polyethylene terephthalate where the resin is not substantially subjected to orientation, thereby to improve the thermal resistance, stiffness and content resistance of such sections to almost the same extent as the biaxially oriented sections of the container such as shoulder and cylindrical sections thereof. The aforesaid sections of the preformed piece before being blow-molded or of the blow-molded container where the resin is not substantially subjected to orientation are first heated at 120°–180° C. for 3–8 minutes and then annealed at room temperatures, with a result that such sections have a spherulite texture of an increased density and are opacified to white or milky white.

3 Claims, 11 Drawing Figures

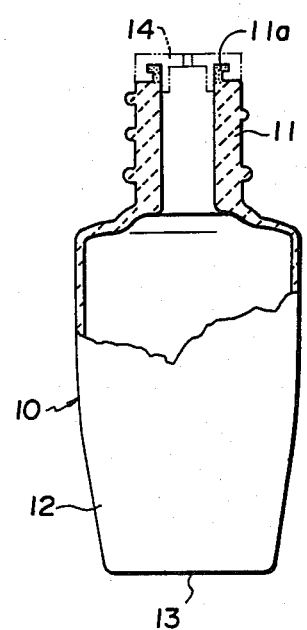
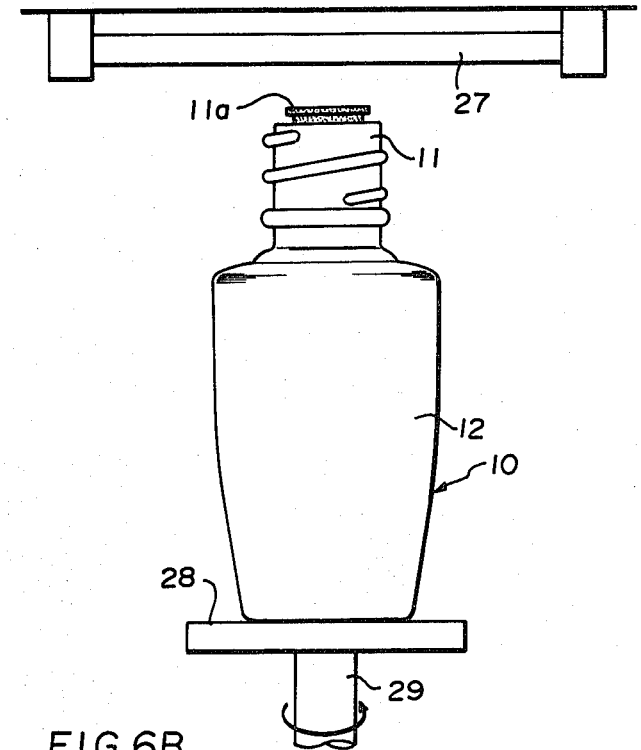
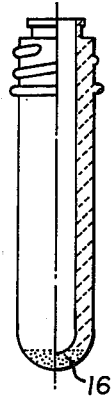
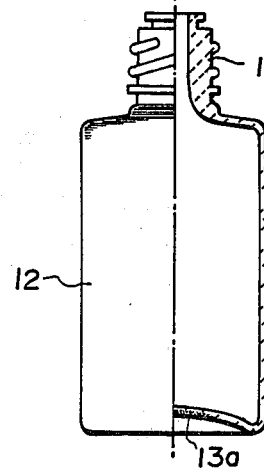
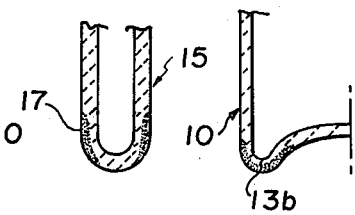
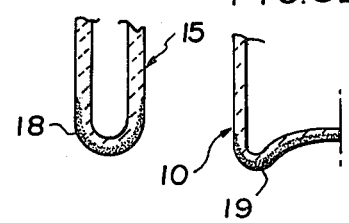

METHOD FOR PRODUCING POLYESTER CONTAINER

This is a continuation of application Ser. No. 19,913 filed Mar. 12, 1979, now abandoned.

BACKGROUND OF THE INVENTION

The present invention relates to a hollow blow-molded container of a biaxially oriented polyester resin and, more specifically, to a process for manufacturing such a container of hollow bottle shape free from crazing regardless of the type of its contents, in which such sections as neck, neck end or bottom section thereof where the resin is not substantially subjected to orientation are protected against thermal deformation.

Polyethylene terephthalate has a wide range of applications in the field of containers for foodstuffs, flavoring materials, cosmetics and so on, because it can be molded, by orientation-blowing, into transparent thin-walled containers having a high stiffness, impact strength and improved hygienic qualities with a higher molding accuracy. In ordinary direct blow molding processes in which the top and bottom parts of an extruded parison are held by a mold and compressed air is blown into the thus held parison to expand the same into a container shape, resultant containers may often be unsatisfactory in respect of strength and transparency because the parison is oriented only monoaxially. Therefore, in blow molding, there prevails a so-called biaxially-orienting blow-molding process in which the parison is oriented not only laterally but also longitudinally in a temperature range suitable for such orientation, and biaxially-oriented blow-molded containers show increased stiffness and strength as well as improved gas barrier properties and transparency. However, even in such a biaxially-orienting blow-molding process, such sections as the neck, neck end and bottom section of the resultant containers cannot enjoy an improvement in physical properties and are susceptible to thermal deformation, because such sections are not subjected to orientation, that is to say, molecular orientation never or hardly occurs and the bond between the molecular chains constituting polymer crystals is not strong in these sections.

As is well-known, those containers which are used for storing volatile liquids require very tight sealing. Therefore, the neck ends of such containers are usually sealed with a crown cap caulked thereon or a cap placed thereon with interposition of a packing.

However, if the neck section is deformed by some external factors such as heat, the aforementioned sealing effect of the sealing means is diminished. While, if the polyester containers are used to store highly-concentrated alcohol, ester, or cosmetics or solvents containing these, the aforementioned non-oriented sections may be permeated by the content to be crazed and, eventually, the liquid content may leak from the neck end. Also, if such containers are filled with carbonated beverages, their bottoms may be bulged out due to an increase in internal pressure and crazing to such an extent to debase their standing stability and, ultimately, the containers may burst.

On the other hand, when such containers are used to store such liquids as juice or sauce that are filled therein under heat-sterilization, their neck end portions may be deformed, due to the filling temperature, to such an extent that the containers cannot be sealed completely even with a cap having an inner sealing seat.

SUMMARY OF THE INVENTION

The present invention provides an improved method for producing a polyester container, especially, biaxially-oriented blow-molded polyester resin container, in which only those portions of the container such as neck and bottom sections which are not substantially subjected to orientation are first heated and then annealed so as to increase the density of spherulite texture in such portions and, thereby, to improve their thermal resistance, stiffness and content resistance to the same extent as those of the cylindrical sections of the container. The cylindrical section has molecules therein oriented by biaxial orientation and its physical properties, especially transparency and mechanical strength, are improved. As a result of the aforementioned heat treatment, the neck and bottom sections are blushed by spherulite texture grown therein and their content resistance is further improved. These sections will not be crazed by penetration of the content such as alcohol, ester, surfactant or the like. Also, since the neck section becomes more tough, a cap or like capping means can be caulked or attached thereonto more stably.

Further, since the thermal resistance is improved by the aforesaid heat treatment, the container can be filled with hotter contents.

Accordingly, an object of the present invention is to provide a bottle-shaped container of biaxially oriented blow-molded polyester resin, in which those portions where the resin is not substantially subjected to orientation are blushed and crystallized by growth of spherulite structure.

Another object of the present invention is to provide a bottle-shaped container of biaxially oriented-blow molded polyester resin, in which the density of spherulite texture in such sections of the container as neck, neck end, and bottom center and periphery where the resin is not substantially subjected to orientation is increased to prevent these sections from being deformed by heat and crazed by the content.

Yet another object of the present invention is to produce a container in a simplified manner, in which those sections of a preformed piece which are not subjected to biaxial orientation in the succeeding blow molding process are subjected to heating and subsequent annealing in advance to improve the thermal resistance and content resistance of these sections.

Still another object of the present invention is to produce a container, in which those sections of the container which are not substantially oriented in the preceding biaxial orientation-blow molding process are subjected to heating and subsequent annealing, after said blow molding process, to improve the strength and content resistance of these sections to almost the same level as those of the cylindrical section of the container.

DETAILED DESCRIPTION OF THE PREFERRED EMBODIMENTS

These and other objects and features of the present invention will become apparent from the following description of the preferred embodiments of the present invention when read with reference to the accompanying drawings, in which:

FIG. 4 is a partially broken section of a container according to the present invention having the upper end portion of its neck section blushed and crystallized;

FIG. 5 is a front view of an equipment for heating only the upper end portion of the neck section of the container;

FIG. 6A is a partially broken section of a preformed piece having its bottom center blushed and crystallized, and FIG. 6B is a partially broken section of a container obtained by biaxial orientation-blow molding of the preformed piece of FIG. 6A;

FIG. 7A is a partially broken section of a preformed piece having its bottom periphery blushed and crystallized, and FIG. 7B is a partially broken section of a container obtained by biaxial orientation-blow molding of the preformed piece of FIG. 7A; and FIG. 8A is a partially broken section of a preformed piece which is blushed and crystallized wholly from the periphery to center of its bottom, and FIG. 8B is a partially broken section obtained by biaxial orientation-blow molding of the preformed piece of FIG. 8A.

Figure 1:
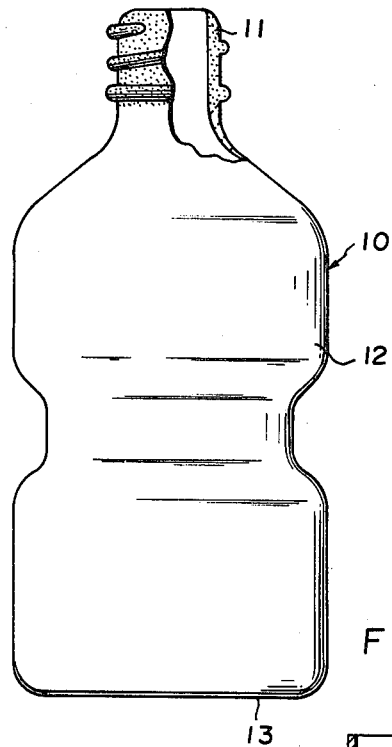
FIG. 1 is a front view of a container according to the present invention, showing its neck section in a partially broken form.

Referring now to the drawings, especially to FIG. 1, the reference numeral 10 is a hollow bottle-shaped container having a threaded neck section 11, cylindrical section 12 and bottom section 13.

The container 10 is obtained by heating a preformed piece of polyethylene terephthalate and, in a mold, orienting the same first in the longitudinal direction and, then, blowing air thereinto to orient the same in the lateral direction.

Those shoulder, cylindrical and bottom sections of the container 10 which are biaxially oriented are transparent, but the neck section 11 having a higher density of spherulite texture shows a milky white color. Such a higher density of spherulite texture is attained by subjecting the container as blow-molded to heating and subsequent annealing.

In the meantime, containers of biaxially oriented-blow molded polyethylene terephthalate resin are sometimes heat-set at a temperature somewhat above the softening point of the resin to improve their thermal resistance.

In such a heat-setting process, the container body is appropriately held by a mold or like means to prevent thermal deformation. However, even with this, the neck section may often be deformed by heat to go out of dimensional accuracy. Therefore, the neck section is blushed and crystallized prior to heat-setting to obtain polyethylene terephthalate resin containers having an improved dimensional stability as well as dimensional stability of their neck sections.

Figure 2:
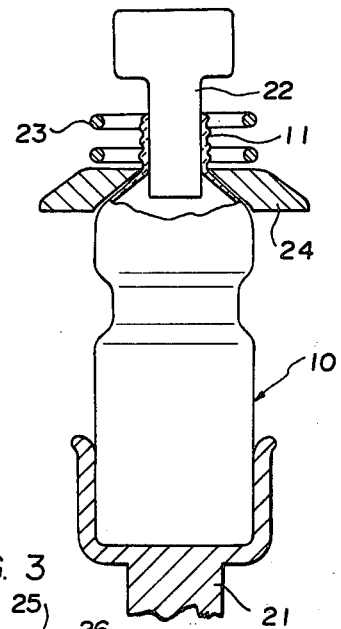
FIG. 2 is a sectional view of an equipment of a preferred embodiment of the present invention used for heating the neck section of the container.

Various means may be devised for blushing and crystallizing the neck section 11 of the container 10, as exemplified by the preferred embodiment according to the present invention shown in FIG. 2.

In the preferred embodiment shown in FIG. 2, the container 10 is placed on a base rest 21, and a hold 22 is inserted in its neck section 11 for preventing inward deformation of the latter. Around the neck section 11, is provided a heater 23 comprising an electromagnetic inductor which heats by radiation and then anneals the neck section 11 to blush and crystallize the same.

A shielding plate 24 provided directly beneath the heater 23 functions to prevent the influence of the radiant heat from reaching those portions of the bottle 10 under the neck section 11. The base rest 21 or hold 22 may be turned to rotate the container 10 relatively to the heater 23 so that the incident radiant heat is evenly distributed around the neck section 11.

Alternatively, in the foregoing preferred embodiment, instead of the hold 22, a metal cap 25 (for example, a split-cavity mold shape cap) may be placed on the neck section 11 to heat the same by applying the radiant heat onto the metal cap 25.

Figure 3:
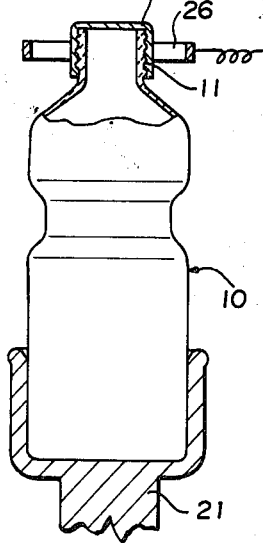
FIG. 3 is a partially broken section of an equipment of another preferred embodiment of the present invention used for heating the neck section of the container.

Further, as shown in FIG. 3, the neck section 11 may be heated through the metal cap 25 which is fitted onto the neck section 25 and induction-heated by electrodes 26 provided externally of the metal cap 25. Thereafter, the neck section 11 is annealed to be blushed and crystallized. The metal cap 25 is removed after this processing.

In the latter case, the base rest 21 and, thus, the container 10 is not required to be rotated relative to the heater. Also, since only the neck section 11 is subjected to heating, the shielding plate 24 is not necessary. Especially, in the preferred embodiment using the cap 25, only the neck section 11 can be heated positively without being deformed.

Theoretically, the minimum temperature at which the resin material, namely, polyethylene terephthalate, of the neck section 11 is crystallized is its glass transition point (70° C.) and the shortest heating time required to crystallize the same is the time that elapses before crystal nuclei begin to be formed. Namely, it must be at least about 2 minutes and 30 seconds. Therefore, heat treatment for about 2 minutes and 30 seconds at about 70° C. is sufficient to crystallize the resin material of the neck section 11.

However, as a matter of course, since the productivity must be increased, without causing a thermal deformation due to overheating, under such conditions that the neck section 11 has a substantial thickness and the resin material does not have a high thermal conductivity, certain limitations are naturally imposed on the heating time and temperature.

As a result of a series of experimentation, the inventors have found that the temperature at which the neck section 11 is crystallized as shown in FIG. 1 without causing a thermal deformation ranges from 120° C. to 180° C. and, preferably, from 140° C. to 170° C., and it is appropriate that, in the foregoing temperature range, the neck section 11 is heated for a time that is required for the entire polyethylene terephthalate resin material thereof to be crystallized, preferably, for 3-8 minutes and, more preferably, for 3-5 minutes, although the heating time varies substantially significantly depending upon the thickness of the neck section 11 and its ambient temperature.

The neck section 11 crystallized under the aforementioned heating conditions appear, in section, as shown in FIG. 2. This particular example shown in FIG. 3 was heated at 155° C. for 4 minutes and 30 seconds.

After being heated as mentioned herein-above, the neck section 11 is cooled at room temperatures for at least 30 seconds to have its density of spherulite texture increased over the entirety thereof and to be blushed and crystallized into milky white color, thus completing the annealing.

As a result of this processing, since not only the crazing resistance of the neck section 11 but also its mechanical properties such as stiffness, impact resistance, abrasion resistance and external pressure resistance are considerably improved, any screwed cap or caulkable cap such as a crown cap that is fitted onto the neck section 11 having the thus improved mechanical strength can maintain the contents of the container 10 in a hermetically sealed state over a longer period.

Also, in the container thus heat-reinforced by the method according to the present invention, since its neck section 11 is blushed, it is identified at a glance and the extent of its heat reinforcement can be easily determined depending upon the degree of blushing.

FIG. 4 shows a container having only its neck end 11a blushed and crystallized. In general, if the neck end is deformed or damaged by stress cracking in fitting thereinto an inner sealing seat 14 or if it is crazed by the contents, the latter may leak out of the neck end. While, if the neck end 11a has its density of spherulite texture increased to be blushed and crystallized, the inner sealing seat 14 can be held in place and securely prevent the leakage of the contents.

If a heater is placed directly above the container 10 to heat the neck end 11a, its upper end face is heated most strongly, but it must be heated circumferentially evenly. For this purpose, the container 10 may be held on a rotatable jig 28 as shown in FIG. 5.

The preferred embodiment of the heating equipment of FIG. 5 uses a far infrared ray bar heater 27 as its heating element. The heater 27 is disposed slightly spaced above and apart from the upper end of the container 10, and the container is placed on the base jig 28 fixed onto the upper end of a rotatable shaft 29 which is rotated at a constant speed.

Thus, since the container 10 is rotated relative to the heater 27 at a constant speed, the neck end 11a is heated evenly in the circumferential direction of the neck section 11. Thus, the heat distribution around the neck end 11a is much improved.

The following table compares the densities of the sections of polyethylene terephthalate containers obtained in the aforementioned manner.

TABLE

|  | Density g/cm³ | |
| --- | --- | --- |
|  | Container #1 | Container #2 |
| Neck end (blushed) | 1.3640 | 1.3582 |
| Neck section | 1.3436 | 1.3441 |
| Cylindrical section | 1.3556 | 1.3555 |

Due to the increased density of a spherulite texture, the neck end has a greater density than those of the neck and cylindrical sections. The density of the neck end could be increased up to 1.37.

Although, in the aforementioned preferred embodiment, the neck end is subjected to heat treatment after the blow-molding of the container, the neck end of a preformed piece constituting the primary molding of the container may be first subjected to heat treatment to be blushed and crystallized before being subjected to a biaxial orientation-blow molding.

FIGS. 6A through 8B show modified preferred embodiments of the containers according to the present invention, in which the bottom section of a preformed piece is subjected to heat treatment to blush and crystallize, in advance, those sections of the container which are not biaxially oriented in the succeeding process.

The preformed piece 15 obtained by injection or extrusion molding is hollow, having thick walls, a bottom, and a prefinished threaded neck 11. As shown in FIG. 6A, the piece 15 has its bottom center 16 heated and annealed in a manner as mentioned previously and the bottom center 16 is blushed with its partially increased density of spherulite texture. The thus treated piece is then heated uniformly at 140° C.–220° C. before being biaxially oriented-blow molded in a mold into a hollow container.

As shown in FIG. 6B, the grown spherulite texture at its bottom center 13a is maintained as it was and, thus, the bottom center can have a sufficient strength against crazing and thermal deformation.

In the preferred embodiment shown in FIG. 7A, the cylindrical section of a preformed piece near its bottom has its periphery 17 heated and annealed, and the periphery 17 is blushed and crystallized with an increased density of spherulite texture. Likewise, the thus treated piece is then biaxially oriented-blow molded into a container as shown in FIG. 7B. As a result of this treatment, a spherulite texture develops in and along the bottom periphery 13b of the container 10 to increase its thermal resistance and to prevent deformation. In FIG. 8A, the preformed piece 15 has its section 18 from the bottom center to periphery heated and annealed so that the section 18 is blushed. Then, the thus treated piece is biaxially oriented-blow molded into a container 10 as shown in FIG. 8B having a developed spherulite texture in and over its entire bottom section 19 ranging from the center to the neighboring periphery.

According to the present invention, as fully described hereinbefore, those sections of a biaxially oriented-blow molded polyester resin container such as its neck, neck end and bottom section which are not substantially oriented are subjected to heat treatment for improving the density of spherulite texture in such sections, so that these sections are protected against deformation and crazing. Also, since the aforesaid sections having a spherulite texture present a milky white color which agreeably contrasts with the transparent cylindrical section, the container may obtain a good-looking pattern according to the present invention.

What is claimed is:

1. A method for producing a hollow bottle-shaped container of biaxially oriented polyethylene terephthalate having a neck section, a bottom section, and a body section extending between said neck section and bottom section from a preform having a prefinished neck section with an annular radially outwardly extending ledge at its lower end, said method comprising the steps:

biaxially orienting in a mold the preform of the container in the regions of the container below the ledge including those immediately therebelow with no stretching in the neck section including the ledge to form the hollow bottle-shaped container;

heating only the neck section, including the ledge, with a radiant heater separate from said mold at least the glass transition temperature for at least 2 minutes 30 seconds and thereafter cooling the neck section to increase the density of the spherulitic texture only in the neck section to produce a container having a milky color only in the neck section including the ledge with the remainder of the container being transparent.

2. A method for producing a hollow bottle-shaped container of biaxially oriented polyethylene terephthalate having a neck section, a bottom section, and a body section extending between said neck section and said bottom section from a preform having a prefinished neck section with an annular radially outwardly extending ledge at its lower end, said method comprising the steps:

biaxially orienting in a mold the preform of the container only in the regions of the container below the ledge including those immediately therebelow with no stretching in the neck section including the ledge to form the hollow bottle-shaped container;

heating only the neck section including the ledge, with a radiant heater separate from the mold at 120° C. to 180° C. for 2 minutes 30 seconds—8 minutes and thereafter cooling the neck section to increase the density of the spherulitic texture only in the neck section to produce a container having a milky white color only in the neck section including the ledge and the remainder of the container being transparent.

3. A method for producing a hollow bottle-shaped container of biaxially oriented polyethylene terephthalate having a neck section, a bottom section, and a body section extending between said neck section and bottom section from a preform having a prefinished neck section with an annular radially outwardly extending ledge at its lower end, said method comprising the steps:

biaxially orienting in a mold said preform of the container only in the regions of the container below the ledge including those immediately therebelow with no stretching in the neck section including the ledge to form the hollow bottle-shaped container;

heating only the neck section including the ledge, with a radiant heater separate from the mold at 140° C. to 170° C. for 3–5 minutes and thereafter cooling the neck section to increase the density of the spherulitic texture only in the neck section to produce a container having a milky white color only in the neck section including the ledge and the remainder of the container being transparent.

* * * * *